(12) United States Patent
Lunt (10) Patent No.: US 6,215,802 B1
(45) Date of Patent: Apr. 10, 2001

(54) THERMALLY STABLE AIR-GAP ETALON FOR DENSE WAVELENGTH-DIVISION MULTIPLEXING APPLICATIONS

(75) Inventor: David L. Lunt, Ballasalla (GB)

(73) Assignee: Blue Sky Research, San Jose, CA (US)

( * ) Notice: Subject to any disclaimer, the term of this patent is extended or adjusted under 35 U.S.C. 154(b) by 0 days.

(21) Appl. No.: 09/357,583

(22) Filed: Jul. 20, 1999

Related U.S. Application Data (63) Continuation-in-part of application No. 09/321,482, filed on May 27, 1999.

(51) Int. Cl.$^7$ ................................................ H01S 3/04
(52) U.S. Cl. ........................ 372/34; 372/19; 372/108
(58) Field of Search ........................ 372/34, 19, 108, 372/98, 99, 57; 356/352

(56) References Cited

U.S. PATENT DOCUMENTS

| | | | |
|---|---|---|---|
| 5,028,879 | * | 2/1900 | Ershov ................................ 372/57 |
| 5,856,991 | * | 1/1999 | Ershov ................................ 372/19 |
| 5,889,590 | * | 3/1999 | Duggal et al. ..................... 356/352 |

* cited by examiner

*Primary Examiner*—Leon Scott, Jr.
(74) *Attorney, Agent, or Firm*—LaRiviere, Grubman & Payne, LLP (57) ABSTRACT

A thermally stable etalon Fabry-Perot etalon and method for making such etalons is disclosed. Particularly, a re-entrant etalon having an etalon gap which may be several times thicker than the etalon riser is presented. The riser and a spacer have differing dimensions and are constructed of materials having different coefficients of thermal expansion such that as the spacer expands increasing the etalon gap the riser expands a corresponding amount to keep the etalon gap in a thermally stable equilibrium. It is required that the etalon gap be formed to a very high degree of precision. In a preferred method of fabrication etalon plates and risers are provided. The etalon plates and risers are manufactured to ordinary precision optical standards. The riser and etalon plate are kept in a spaced apart relationship by spacers. To increase etalon gap precision, the spacer thicknesses are adjusted to high degrees of precision using special coatings. Once a coating of appropriate thickness is formed on the spacers, a plurality of thermally stable highly precise etalons having a free spectral range of 100 GHz and a thermal expansion coefficient of less than $5\times10^{-8}$ may be assembled. The method of the present invention may also be used to adjust the etalon gap of telescopic etalon filters.

54 Claims, 10 Drawing Sheets

THERMALLY STABLE AIR-GAP ETALON FOR DENSE WAVELENGTH-DIVISION MULTIPLEXING APPLICATIONS

RELATED APPLICATION

This application is a continuation-in-part of the copending application Ser. No. 09/321,482, entitled "High Performance Telescopic Etalon Filters" filed on May 27, 1999. The present application claims priority to said continuation-in-part application which is hereby incorporated by reference.

TECHNICAL FIELD

The present invention relates to the use and construction of etalon filters. In particular, etalons used in telecommunications data transmission. More specifically the present invention relates to etalons used in Dense Wavelength Division Multiplexing. In addition the principles of the present invention also contemplate use in telescopic filters.

BACKGROUND OF THE INVENTION

In modern telecommunication systems, it is becoming ever more important to increase the density of data transmitted over any particular transmission line. As such it is advantageous to increase the number of the effective bandwidths useable by each transmission line. The advent of the Internet in the past few years has further accelerated the race for higher data transmission density.

When the transmission line is a fiber-optic cable, one method of expanding the effective data transmission capacity is to transmit a number of closely spaced optical frequencies on each cable. Such optical frequencies are also referred to as "carrier frequencies". By separately modulating and demodulating each such carrier frequency, the amount of information that may be carried on one fiber-optic cable can be substantially increased. This technique is called "Wavelength-Division Multiplexing" (WDM) and, when the spacing between the wavelengths gets very small, the technique is referred to as "Dense Wavelength-Division Multiplexing" (DWDM).

In a typical telecommunications application, laser diodes are used to provide optical signals which are transmitted through fiber optic cables. Presently, these signals are produced by a series of laser diodes whose output is a series of carrier wavelengths (frequencies) separated by a specified amount. For example, several diodes each producing signal at a different wavelength separated by 100 GHz (gigahertz) produce a composite signal which may be directed down a single optical fiber. These carrier frequencies are modulated and multiplexed to carry a multiplicity of signals on the same optical fiber. At the receiving end of the fiber, the carrier frequencies are demultiplexed and demodulated.

Multiplexing and demultiplexing of the carrier signals may be accomplished by various means, including optical gratings or coated optical interference filters. However, the use of such optical gratings and interference filters present certain problems which have not yet been overcome in the industry. Conventional air-spaced etalon filters have also been used to separate carrier signals as well as provide frequency standards used to monitor the lasers generating the carrier signals. However, current methods of producing precision etalons is a highly specialized "craft" more in the nature of an "art". Furthermore, such etalons are typically manufactured in small quantities of only a few units at a time. Currently, there is no known method of mass producing etalons having sufficient optical quality for this application. As a result, etalons of this type are not suitable for applications requiring large numbers of etalons (e.g. telecommunications applications).

Related Technologies

As explained above, existing methods of carrier frequency separation suffer from a number of limitations. For example, interference filters used to separate carrier frequencies can not achieve the necessary degree of thermal stability. This difficulty is particularly apparent when such filters are used to achieve DWDM with narrow band or dense channel spacing requirements of 100 GHz (0.8 nm) or smaller. The inventor does not know of any interference filters currently capable of meeting the demanding standards set up by the International Telecommunications Union (ITU) grid.

The information contained below is a draft of the proposed ITU frequency grid. It should be noted that this grid has not been finalized:

| λ (in nm.) | f (in THz) |
|---|---|
| 1530.33 | 195.900 |
| 1531.12 | 195.800 |
| 1531.90 | 195.700 |
| 1532.68 | 195.600 |
| 1533.47 | 195.500 |
| 1534.25 | 195.400 |
| 1535.04 | 195.300 |
| 1535.82 | 195.200 |
| 1536.61 | 195.100 |
| 1537.40 | 195.000 |
| 1538.19 | 194.900 |
| 1538.98 | 194.800 |
| 1539.77 | 194.700 |
| 1540.56 | 194.600 |
| 1541.35 | 194.500 |
| 1542.14 | 194.400 |
| 1542.94 | 194.300 |
| 1543.73 | 194.200 |
| 1544.53 | 194.100 |
| 1545.32 | 194.000 |
| 1546.12 | 193.900 |
| 1546.92 | 193.800 |
| 1547.72 | 193.700 |
| 1548.51 | 193.600 |
| 1549.32 | 193.500 |
| 1550.12 | 193.400 |
| 1550.92 | 193.300 |
| 1551.72 | 193.200 |
| 1552.52 | 193.100 |
| 1553.33 | 193.000 |
| 1554.13 | 192.900 |
| 1554.94 | 192.800 |
| 1555.75 | 192.700 |
| 1556.55 | 192.600 |
| 1557.36 | 192.500 |
| 1558.17 | 192.400 |
| 1558.98 | 192.300 |
| 1559.79 | 192.200 |
| 1560.61 | 192.100 |
| 1561.42 | 192.000 |
| 1562.23 | 191.900 |
| 1563.05 | 191.800 |
| 1563.86 | 191.700 |
| 1564.63 | 191.600 |
| 1565.50 | 191.500 |

Bragg gratings have also been used to solve the carrier frequency separation problem. Unfortunately, Bragg gratings are extremely sensitive to temperature variation and require expensive temperature control mechanisms to stabilize systems using them. Additionally, Bragg gratings require costly optical circulators or an interferometric Mach-Zehnder setup to pass the selected wavelengths.

Another method currently used to separate carrier frequencies is the arrayed waveguide grating (AWG). AWGs suffer from inferior filter passbands, and a rather severe polarization-dependent signal loss, and poor non-adjacent channel isolation as compared to other existing technologies. As a result, AWGs often require the addition of other technologies to achieve separation which extends beyond 16 channels, increasing the overall cost of such systems.

Another technique sometimes used to separate carrier frequencies is by using a Fabry-Perot etalon. Such etalons are the subject of the present invention. One major drawback to using etalons is that, until now, it has not been possible to mass produce etalons which provide the needed bandwidth separation and provide sufficient temperature stability.

Fabry-Perot Etalons

The concept of Fabry-Perot etalons is well known in the art and is discussed in a number of classic texts. For example, M. Bom and E. Wolf, "Principles of Optics" Pergamon Press (1980) incorporated herein by reference. In general, a Fabry-Perot etalon consists of two parallel surfaces separated by a gap. The two surfaces may have an optical coating applied to their surfaces or may be uncoated. The surfaces can be the opposing faces of two separate plates separated by a gap, the gap being filled with air or a vacuum. Such an etalon is referred to as an "air-spaced etalon". An etalon may also be constructed using two parallel surfaces on opposite sides of a single solid plate. This is referred to as a "solid etalon". Both types are used extensively in spectral analysis, laser-line narrowing, mode selection, and as integral components in the construction of ultra-narrow band optical filters, as well as many other instances where spectral selection is desired.

An air-spaced etalon can be made extremely thermally stable, whereas a solid etalon is subject to changes in its optical thickness based on changes in ambient temperature, causing etalon passband wavelengths to vary with changing temperature. In the telecommunications industry, it is desirable to have stable passbands over a widely varying conditions, including temperature. Therefore, the use of air-spaced etalons has been favored.

Figure 1:
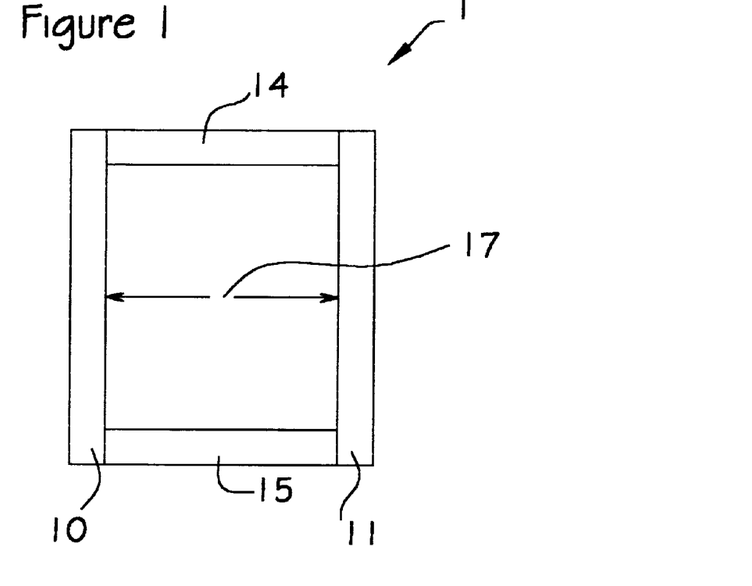
FIGS. 1 and 2 are cross-section views of prior art etalons constructed according to known principles.

Historically, air-spaced etalons have been constructed using two different designs. FIG. 1 shows an etalon 1 having two parallel optically flat surfaces (also called plates or etalon plates) 10, 11 separated by spacers 14, 15, which define a gap 17 equal to the length of the spacers 14, 15. As the ambient temperature changes, the spacers 14, 15 expand and contract leading to an expansion and contraction of the gap 17, effectively changing the passband wavelength of the etalon 1.

Figure 2:
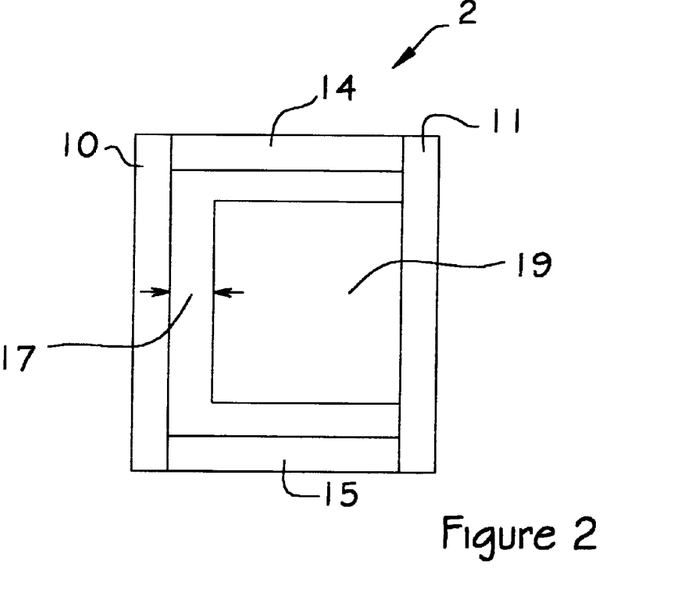

FIG. 2 illustrates an alternative design known as a "re-entrant" etalon 2. Such etalons feature a third plate known as a risers 19. Re-entrant etalons 2 are frequently used when a gap 17 of less than about 0.5 millimeters (mm) is desired. The gap 17 in re-entrant etalons is defined by the difference in length between the spacers 14 and 15 and the thickness of the riser 19. The optical quality of the etalon 2 and consequently its efficiency is governed by two factors, the flatness of the plates 10, 11 and the parallelism of the gap 17. In any etalon, the flatness of the plates is a limiting parameter. In the air-spaced etalon, the parallelism of the gap is controlled by the ability to form spacers demonstrating adequate parallelism and, additionally, in the case of the re-entrant design (FIG. 2), the ability to form and assemble an adequately parallel riser 19.

The thermal stability of air-spaced etalons may be increased if the etalons are constructed of materials having low coefficients of thermal expansion (materials which expand/contract little with changing temperature). As etalon (1, 2) materials expand or contract with changing temperature, the gap 17 also expands and contracts. This characteristic defines an "effective coefficient of thermal expansion ($\alpha$)" of the gap 17. In other words, if g=width of gap, and $\Delta T$=a change in temperature that produces a $\Delta g$, the effective coefficient of expansion of the gap is defined by:

$$\alpha_g = \frac{\Delta g}{\Delta T}$$

The coefficient $\alpha$ of the gap 17 may be controlled either by the intrinsic thickness of the spacers 14, 15 (as shown in FIG. 1) or by the difference in the thickness of the spacers 14, 15 and the riser plate 19 (as shown in FIG. 2) and also by the coefficient of thermal expansion of the materials used. In typical re-entrant etalons, the width of the gap 17 ranges from about $10\mu$ to about $500\mu$, while the thickness of a typical riser 19 is on the order of 5 mm to 20 mm. This results in risers 19 that are commonly 10 to 1,000 times thicker than the width of the gap 17.

Although it may be possible to hand-manufacture small numbers of air-spaced etalons of the type described above, and such etalons may meet the demanding temperature stability requirements needed in commercial DWDM applications, there is no presently known method for constructing such devices in large quantities, a necessary requirement for components in the telecommunications industry. What is needed is an etalon having a high degree of thermal stability, sufficient optical precision, and a method of mass producing such etalons. Any such etalon must meet the demanding standards of the telecommunications industry as well as provide a free spectral range of 100 GHz or less. Additionally, there is a need for etalons with sufficient optical fidelity to allow the etalons to serve as telescopic filters and a method tuning such etalons as well as a method for mass producing these precision etalons.

SUMMARY OF THE INVENTION

Accordingly, the principles of the present invention contemplate etalon filters having a high degree of thermal stability and methods for mass producing said etalons.

A thermally stable etalon constructed according to the principles of the present invention comprises a first optical element and a second optical element. The first and second optical elements are separated by at least one spacer having a known coefficient of thermal expansion. A third optical element (e.g. a riser) is optically contacted to said second optical element. The third optical element being separated from said first optical element by a gap. The present invention creates thermal stability in the gap by careful selection of spacer and riser materials. The size and materials of the risers and spacers are chosen such that the thermal expansion of the spacer is compensated for by the thermal expansion of the riser. This dynamic balancing of thermal expansions creates a gap of stable width.

Additionally, etalons constructed in accordance with the principles of the present invention have a ratio of gap thickness to riser thickness that is substantially greater than that of previously known etalons.

Also, etalons constructed in accordance with the principles of the present invention may have etalon spacers which have been treated with thin coatings which are used to precisely adjust etalon spacer thickness forming very high precision etalons.

In accordance with the principles of the present invention a method of mass producing the etalons is disclosed. Riser and etalon plate substrates of an appropriate thickness and having the appropriate coatings are provided. The riser and etalon plate substrates are cut into appropriately sized pieces and optically worked to relieve stress. A spacer substrate of appropriate thickness is also provided. A sample spacer is cut from the spacer substrate and optically worked. A test etalon is assembled from the etalon plates and a riser piece along with the sample spacer. This test etalon is tested. The test result information is used to determine whether the application of additional coating material is required to achieve the desired spacer thickness. The spacer substrate is then treated with additional coating material until the substrate reaches the desired thickness. The coated spacer substrate is then cut into appropriately sized pieces which are optically worked to relieve stress. A plurality of etalons having the desired optical performance are then assembled from the pieces.

Other features of the present invention are disclosed or apparent in the section entitled "DETAILED DESCRIPTION OF THE INVENTION".

BRIEF DESCRIPTION OF THE DRAWINGS

For a fuller understanding of the present invention, reference is made to the accompanying drawings in the following Detailed Description of the Invention. Reference numbers refer to the same or equivalent parts of the invention throughout the several figures of the drawings. In the drawings.

DETAILED DESCRIPTION OF THE INVENTION

Figure 3:
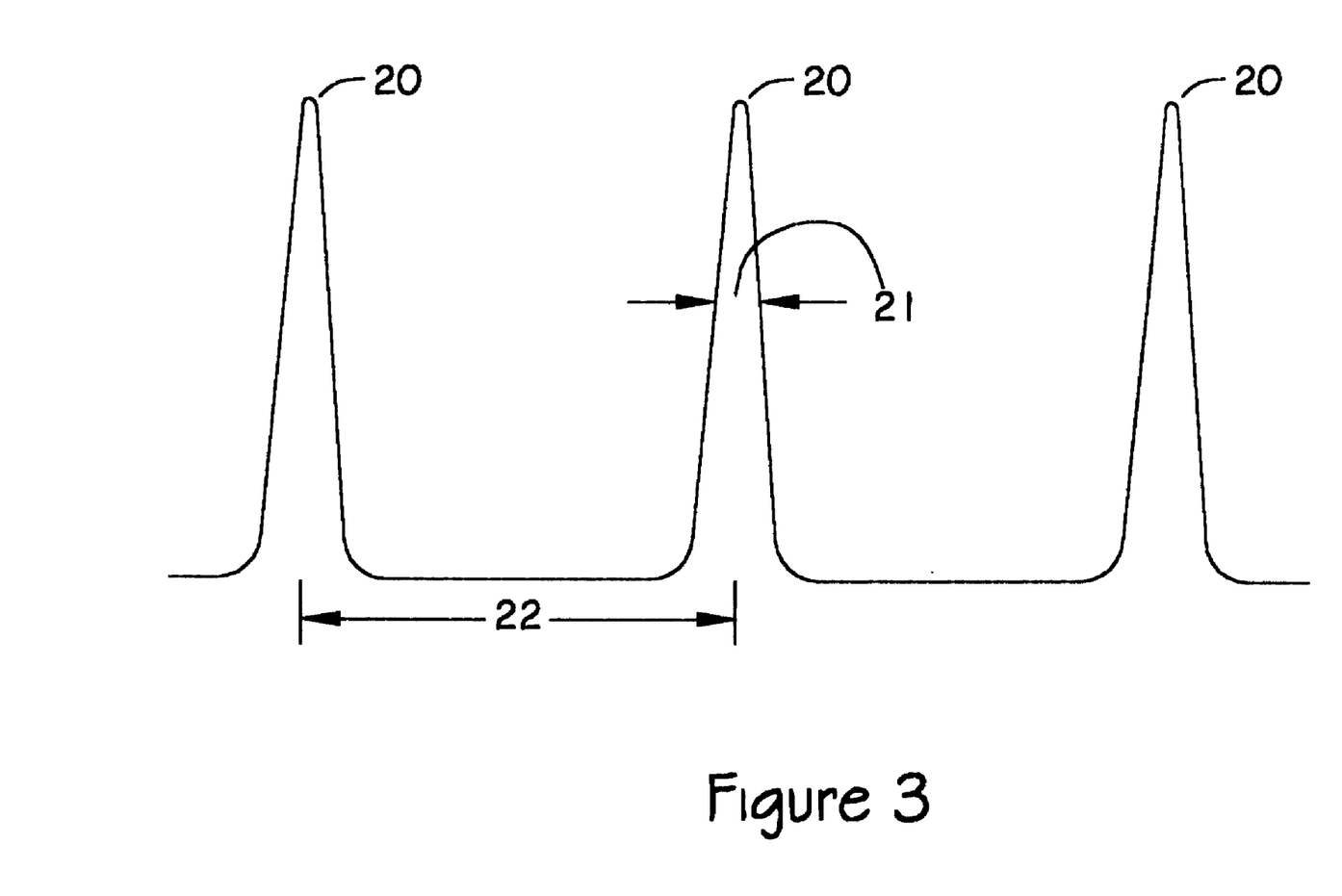
FIG. 3 is a graphical representation of an optical signal separated into a plurality of optical channels.

With reference to FIG. 3, by passing an optical signal through an etalon filter a spectral map of etalon performance or "channel spectrum" may be created. The channels 20 are at specific carrier frequencies or passbands which are determined by the characteristics of the etalon. Each channel has a bandwidth 21. The separation between the optical channels 20 is the Free Spectral Range (FSR) 22. The FSR 22 and bandwidth 21 may be used to define another relevant parameter known as the finesse (F).

$$F = \frac{FSR}{\text{bandwidth}}$$

These terms and parameters are used to determine etalon performance.

What is needed for DWDM applications is an etalon which meets the following requirements:

1. The FSR 22 of the etalon must match the telecommunications recognized wavelength separation standard within a very high tolerance. The FSR 22 is the wavelength separation of adjacent transmission peaks 20 in the signal, for which the present specification is 100 GHz.

2. The transmission peaks 20 of the etalon must coincide with the recognized ITU telecommunications standard grid which determines the specific bandpass wavelengths at which optical signals should pass.

3. The light transmission of the etalon must be of a very high order in order to limit transmission losses.

4. The etalon performance must remain stable and meet the specifications over a very large range of temperature conditions in accordance with international standards. To accomplish the required stability requires that gap expansion or contraction be such that the bandpass peaks 20 do not vary in wavelength by more than 1 picometer/K., far beyond the stability of currently available air-spaced etalons.

Figure 5:
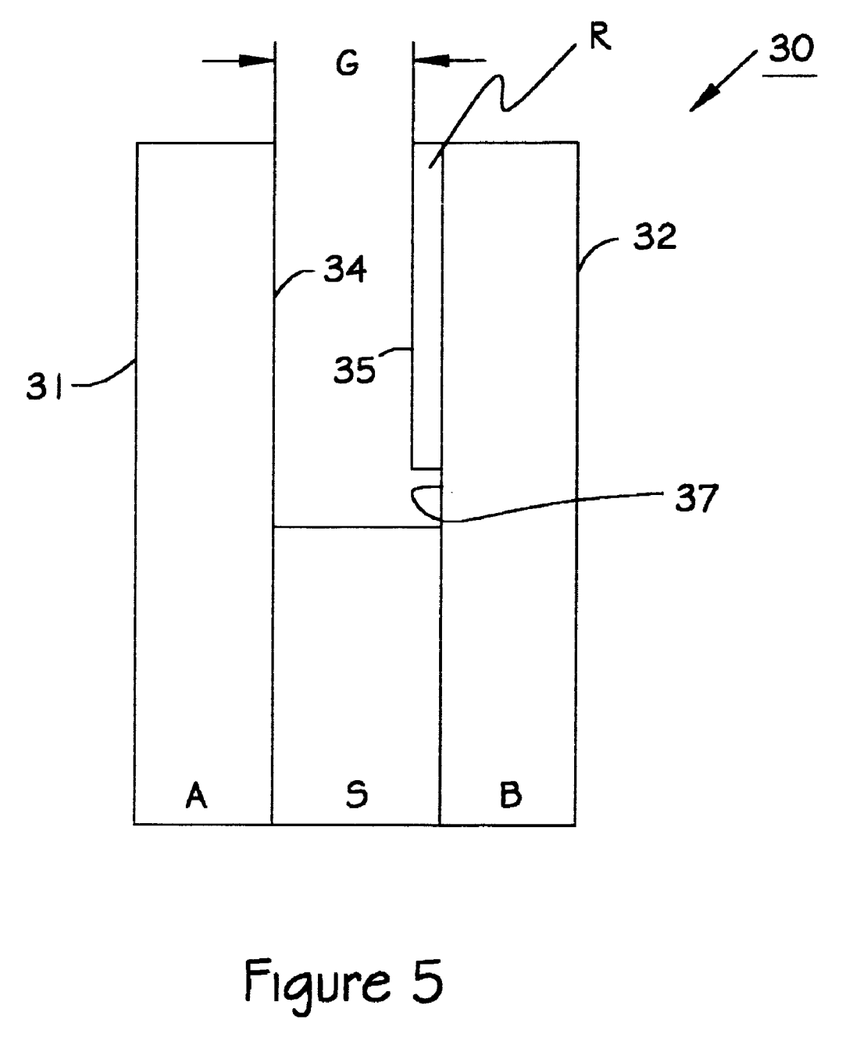
FIG. 5 is a cross-section view of an embodiment of an etalon constructed according to the principles of the present invention.

In accordance with the principles of the present invention, an air-spaced etalon 30 that meets the above-mentioned performance requirements is shown in FIG. 5. The etalon 30 embodiment shown in FIG. 5 features first and second optical elements A and B (also referred to as plates or etalon plates) separated by a fourth element S (also referred to as a spacer). Plates A, B are typically constructed using low thermal expansion materials. A preferred material, fused silica, has a coefficient of thermal expansion of $5.1 \times 10^{-7}$/K. The plates A and B are typically about 2 mm thick, the plate thickness not being critical to the practice of the invention. The outside surfaces 31 and 32 of the elements A and B, respectively, may be coated with a suitable anti-reflective coating, as is well known in the art.

A third optical element (also referred to as a riser) R, is optically contacted to element B. As with the plates A and B, the riser R is formed of a low thermal expansion material such as fused silica. The inner face 34 of A and the inner face of 35 of the riser R can each be optically coated to attain the necessary reflectance to achieve the desired Finesse. In an etalon optimized for a 1550 mn passband, a preferred riser thickness is about 0.274 mm.

The spacer S is typically formed of a material having a lower coefficient of thermal expansion than the riser R. Such a material is Clearceram Z produced by Kabushiki Kaisha Ohara of Kanagawa, Japan. Clearceram Z has a coefficient of thermal expansion of $8.0 \times 10^{-8}$/K. The spacer S is "optically contacted" to each of elements A and B. Elements are said to "optically contacted" when the elements are placed in such intimate contact with each other that the Van der Waals forces between the elements bond the elements together. Such optical contacting is known to those having ordinary skill in the art.

Thermal stability of the etalon 30 may be established by having a thick spacer S having a certain coefficient of thermal expansion and a relatively thin riser R having a larger coefficient of thermal expansion. As the spacer S expands to increase the gap width G, the riser R expands to decrease the gap width G, creating dynamic stability in the gap width G. The relative thickness' of riser R and spacer S and the difference in thermal expansion coefficients between riser R and spacer S compensate to establish the thermal stability of the gap G.

To optimally achieve thermal stability in the air-gap, the etalons of the present invention are constructed such that the thermal expansion of the spacer is equal to that of the thermal expansion of the riser. Such behavior is modeled by the following equations:

$$\alpha_g G = \alpha_s d_s - \alpha_r d_r - \alpha_c d_c$$

where:
G=the thickness of the etalon gap
$d_s$=the thickness of the spacer
$d_r$=the thickness of the riser
$d_c$=the thickness of the optical coatings on the riser and etalon plates and where:
$\alpha_g$=the desired coefficient of thermal expansion for the gap (in an idealized case: 0)
$\alpha_s$=the coefficient of thermal expansion of the spacer
$\alpha_r$=the coefficient of thermal expansion of the riser
if the desired $\alpha_g$ is zero and
if gap width is the difference between riser thickness and spacer thickness:

$$G = d_s - d_r$$

then the thickness of the riser $d_r$ is:

$$d_r = \frac{(\alpha_s G - \alpha_c d_c)}{(\alpha_r - \alpha_s)}$$

Since the gap width G is already known (i.e. to provide the desired FSR) the equations can be used to determine $d_r$ and $d_s$. Furthermore, since the optical coatings are extremely thin, the $d_r$ may be approximated by the equation:

$$d_r = \frac{\alpha_s G}{\alpha_r - \alpha_s}$$

This results in risers R that are many times thinner than those used in prior etalons. Etalons incorporating riser thickness to gap width ratios from about 1/5 to about 1/50,000 advantageously allow the invention to be more efficiently constructed. The preferred embodiment shown uses a gap width G about six (6) times as thick as the riser thickness $d_r$.

Preferred Embodiment

A preferred embodiment of the present invention is illustrated in FIG. 5. Although the preferred embodiment uses specific materials having specific dimensions, the principles of the invention apply to other materials and dimensions. The key concept being that different low thermal expansion materials are use to construct the spacers and risers. The combination of materials and dimensions are used to offset thermal variation in etalon gap width. As shown, the space between the optical surfaces 34, 35 defines the air gap G of the etalon 30. In the preferred embodiment, elements A and B are about 2 mm thick and constructed of fused silica. Spacer S is constructed to be 1.776 m thick using Clearceram Z, the tolerance being +0.000/−0.m. Riser R constructed of fused silica is 0.274 mm thick, the tolerance being ±0.m. In this manner the gap G has a coefficient of thermal expansion $\alpha$ of less than or equal to $1 \times 10^{-9}$/K. In other words, the thermal stability of the air gap G is at least one and probably two orders of magnitude more thermally stable than any other known etalons.

Furthermore, certain optical coatings may be applied to the etalon to enhance etalon performance. In particular, optical coatings can be used to determine the Finesse of etalons. In constructing etalons 30 which have optimal performance at the DWDM wavelength range, certain optical coatings are preferred. One such combination is layered coatings of amorphous hydrogenated silicon (a:S(H)) and silicon dioxide ($SiO_2$), both of which may be deposited from a silicon target. Due to the extremely high refractive index differential between a:S(H) and $SiO_2$, high reflectance coatings can be constructed using only a very few layers of material. For example, if an etalon 30 having a finesse (F) of 50 is desired, a coating having a reflectivity of greater than 94% is required. Advantageously, this may be accomplished using as few as five a:S(H)/$SiO_2$ layers (a:S(H) layers being about 130 nm thick and $SiO_2$ layers being about 270 nm thick). A preferred method of depositing these layers is by "Reactive Ion RF Magnetron Sputtering" (RIRFMS) such as discussed in U.S. Pat. Nos. 5,525,199 and 5,851,365 to Scobey and in U.S. Pat. No. 5,656,138 to Scobey et al. each of which are hereby incorporated by reference. Such methods achieve excellent coating uniformity on large substrates such as those used by the present invention. It should be noted that many methods of fabricating effective coatings are known to the skilled practitioner and may alternatively be used to form coatings having the necessary reflectivity.

Regardless of coating type used in construction, the etalon design and materials must be known in order to determine the effective $\alpha$ of the gap G; a factor that governs the precise final thicknesses of the spacer S and riser R.

Fabrication Methods Used to Construct a Preferred Embodiment of the Invention

In the construction of etalons, the optical quality of the etalon and, consequently, its efficiency, is governed by two factors: The flatness of the plates and the parallelism between the plate surfaces. In any etalon, the flatness of the plates is a limiting parameter. Strictly speaking, it is not required that the individual plates be intrinsically flat, but have surface contours that match to each other to a very high degree, typically less than one-hundredth (0.01) of the wavelength ($\lambda$) of the light intended to be used in the device. In an air-spaced etalon, the parallelism of the gap is controlled by the ability to fabricate pairs of spacers which are adequately parallel and, in the case of re-entrant designs, the added ability to fabricate a riser R which is adequately parallel to the opposing plate A. In existing methods of manufacture, once a given parallelism for these components is achieved, there is no simple way of improving the degree of parallelism of a completely assembled etalon. Thus, as assembled, an etalon has fixed tolerances which control the achievable bandwidth and transmission of the etalon structure.

The chief problems involved in such etalon construction are:

1. Manufacturing the etalon plates such that pairs of etalon plates have a sufficiently high optical quality (typically less than $\lambda/100$ of their intended operational wavelength).

2. Maintaining those tolerances despite the surfaces being treated with optical coatings. This is particularly troublesome because optical coatings induce stress in the etalon plates. This stress bends the etalon plates preventing the plates from attaining the optical tolerances required. So-called "soft coatings" induce a less stress on the plates but, these soft coatings are easily damaged by environmental and mechanical causes. Furthermore, even soft coatings can bend the etalon plates more than what is acceptable to achieve the required optical tolerance.

3. The performance of the etalon is also controlled by the parallelism of the spacers and, in re-entrant designs, the parallelism of the riser. Overall, etalon performance depends on the combined effect of plate stress, plate flatness, and parallelism of the plates or risers.

Existing methods of construction have great difficulty in meeting all the performance criteria.

Figure 6:
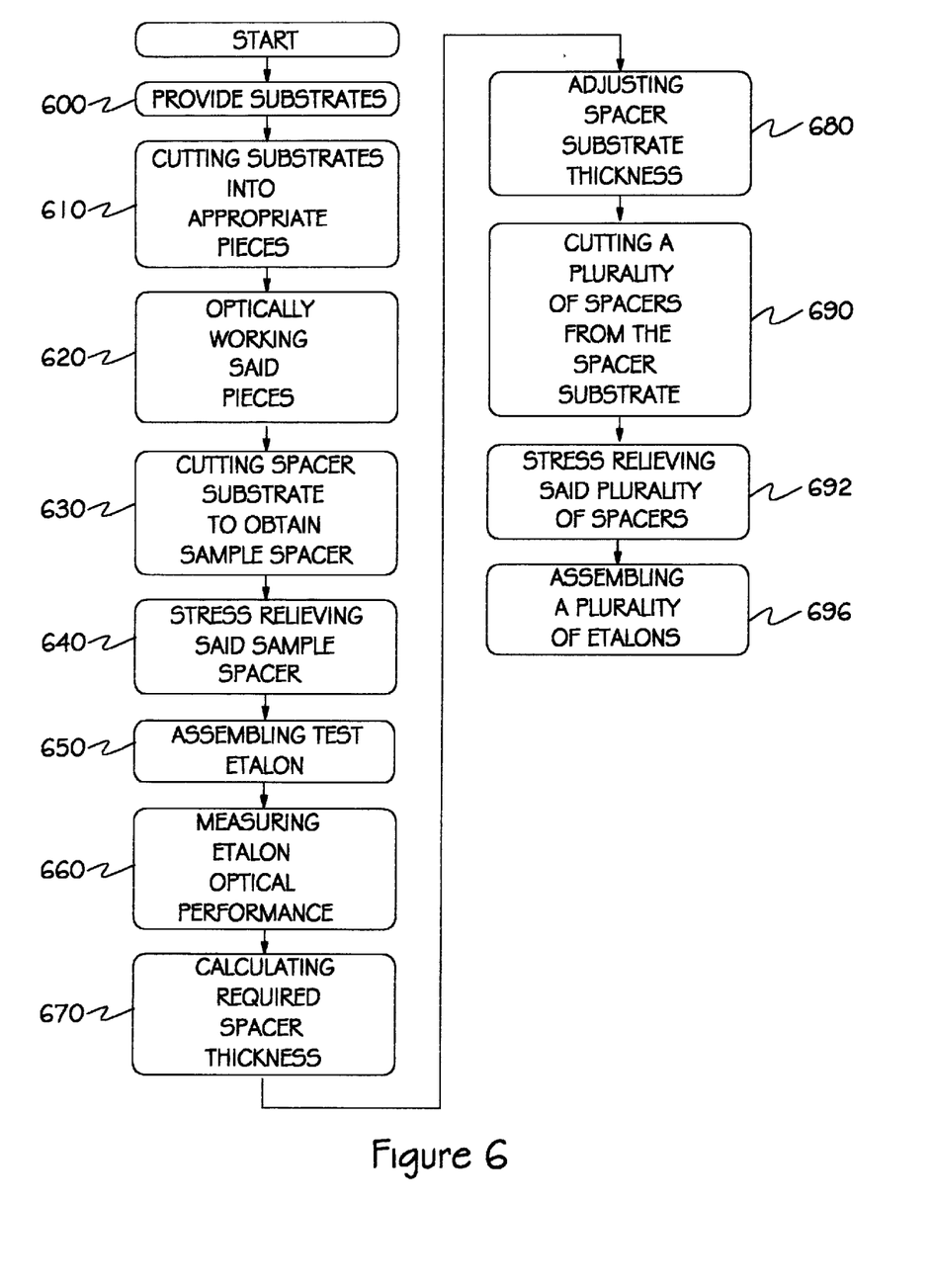
FIG. 6 is a flowchart showing a method of constructing etalons in accordance with the principles of the present invention.
Figure 7:
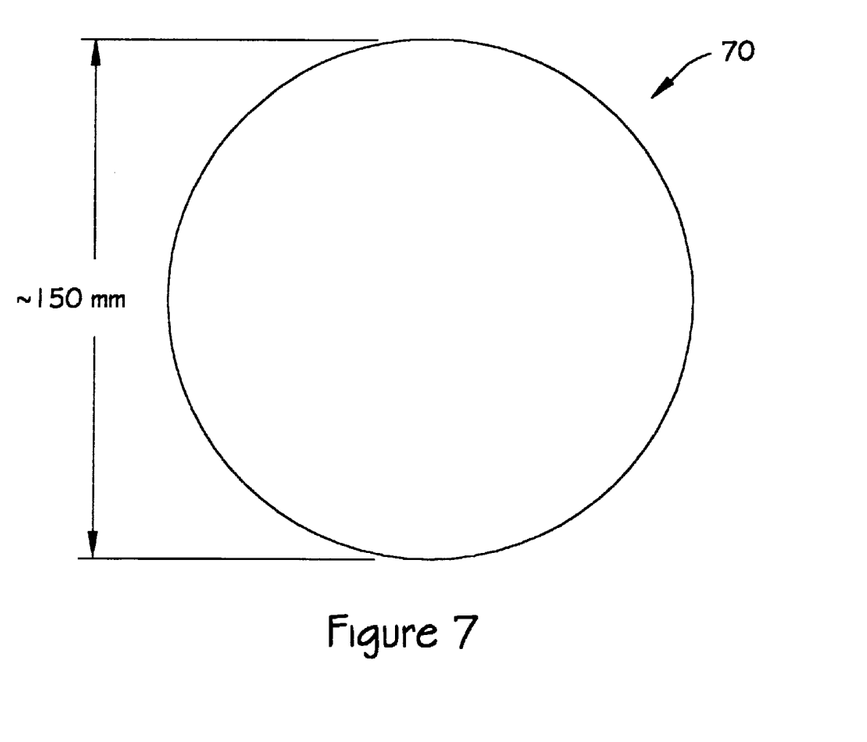
FIG. 7 is a plan view of a substrate used to fabricate etalon components in accordance with the principles of the present invention.

However, the principles of the present invention contemplate an improved etalon and methods of etalon construction. Referring to FIGS. 5, 6, and 7, in Step 600, appropriate substrates are provided. This includes providing a large diameter (for example, 150 mm) first substrate 70 of an appropriate material having an appropriate thickness. For example, a first substrate 70 constructed of fused silica being about 2 mm thick (said thickness not being critical to the ultimate performance of the etalon 30) is provided. For acceptable optical performance, the first substrate 70 must be smooth. This means that the surface roughness of the plates should be less than 0.5 nm RMS. Surface roughness is a measure of variance from absolute flatness of the plates. The plates should also have a smooth surface figure which does not differ from a plane by more than 5 nm over a spatial frequency of 0.5 cm on one surface of the plate, and less than 25 nm over the same spatial frequency on the other surface of the plate. Furthermore, the substrate 70 should be manufactured to a high degree of parallelism. This means that the opposing plate surfaces of the substrate 70 should be made parallel to a high degree. The plate surfaces of substrate 70 should be made parallel to less than 2 arcsecs. Such etalon plates may be formed using ordinary precision optical manufacturing techniques known to those having ordinary skill in the art.

If the first substrate 70 is to be used to construct a large number of plates A, then one surface of the substrate 70 may be coated with an ultra-hard, low-loss, dielectric, reflective coating suitable to achieve a required Finesse. For example, to achieve a Finesse of fifty (50) the five layered a:Si(H)/SiO$_2$ coating discussed above may be used. This surface corresponds to surface 34 of optical element A. If the etalon 30 is to be optically contacted to adjacent components (not shown), then the second side of the substrate 70 (corresponding to side 31 of element A) can be uncoated. Also, if there is no need to optically contact side 31 of the etalon to other components, then side 31 may be treated with a suitable anti-reflective coating. As part of Step 600, a second substrate 70 which is used to construct element B is also provided. The second substrate is constructed to the same standards and of the same materials as the first substrate. The side of the substrate 70 which corresponds to the side 32 of element B may also be treated with an ultra-hard, low-loss, dielectric, anti-reflective coating. Typically, the other side (corresponding to side 37) remains uncoated.

Continuing Step 600, a third (riser) substrate is provided. The third substrate is used to fabricate risers R. In an typical DWDM etalon, very thin risers are preferred, for example, a preferred riser substrate thickness is 0.274 mm±0.001 mm. The parallelism of the riser substrate should be less than 0.2 arcsecs. The riser substrate is coated on one side (the side that corresponds to side 35 of riser R) with an ultra-hard, low-loss, dielectric, reflective coating of equal reflectance and the same design as the coating of side 34 of element A. Another advantage of thin risers R is that when they are optically contacted to element A they conform to the surface contour of element A.

Also, as part of Step 600, a fourth substrate is provided. The fourth (spacer) substrate is used in the construction of spacers S. A preferred spacer substrate thickness is about 1.776 mm±0.000\.001, having the same surface roughness, smooth surface figure, and parallelism as the first and second substrates. The spacer substrate is constructed of a material having a lower coefficient of thermal expansion than the riser material. In a typical example, the first and second riser substrates are all constructed of fused silica. Therefore, a satisfactory spacer S may be constructed of Clearceram Z. The spacers S are constructed having optical tolerances of less than 5 nm from flat over spatial frequencies of 0.5 cm and a parallelism of less than 0.2 arcsecs. It is critical that the spacers not be made too thick. Therefore, the finished spacer S thickness is 1.776 mm+0.0 mm/−0.001 mm which is less than the final desired thickness. Such substrates may be constructed using ordinary precision optical manufacturing techniques known to those having ordinary skill in the art.

Figure 8:
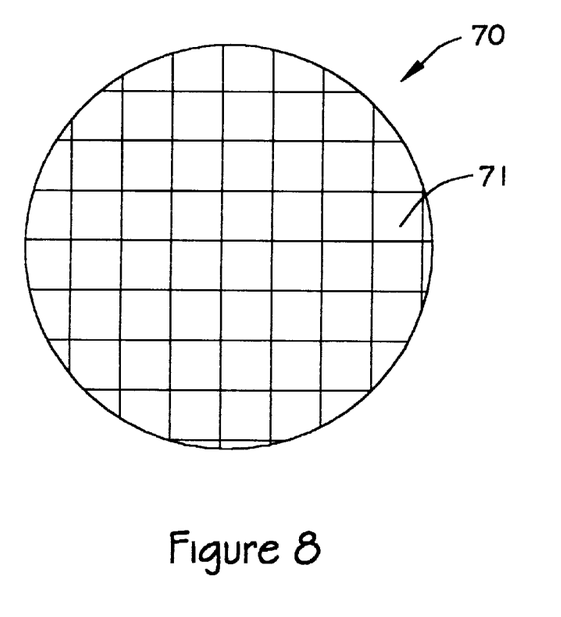
FIG. 8 is a plan view of the substrate of FIG. 7 showing the cuts needed to fabricate many etalons from one substrate.

With reference to FIGS. 6 and 8, in Step 610, the substrates are cut into individual pieces. For A and B elements, the first and second substrates 70 are cut into appropriately sized pieces 71, preferred dimensions being about 2.5 mm×6 mm. These pieces 71 correspond to the A and B elements of etalons 30.

Figure 9:
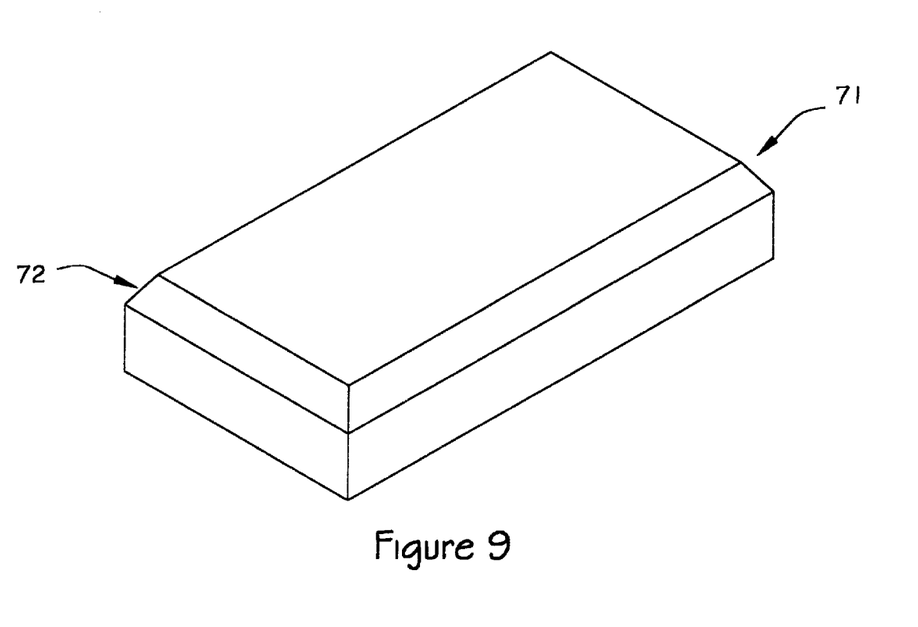
FIG. 9 is a perspective view of an optically worked etalon optical element.

With reference to FIGS. 6 and 9, in Step 620, the edges 72 of the pieces 71 are stress relieved by optically working the pieces, for example, by grinding, polishing, and chamfering to remove any residual stress resulting from the cutting process. The edges 72 of the pieces 71 are lightly chamfered, for example, to about 0.25 mm at 45°. Also in Step 610, the third substrate is cut into appropriately sized riser R pieces. Such riser R pieces are cut into individual pieces measuring, for example, 2.5×2.5 mm and in Step 620 the cut edges of the riser R pieces are optically worked as above to remove stress.

Figure 10:
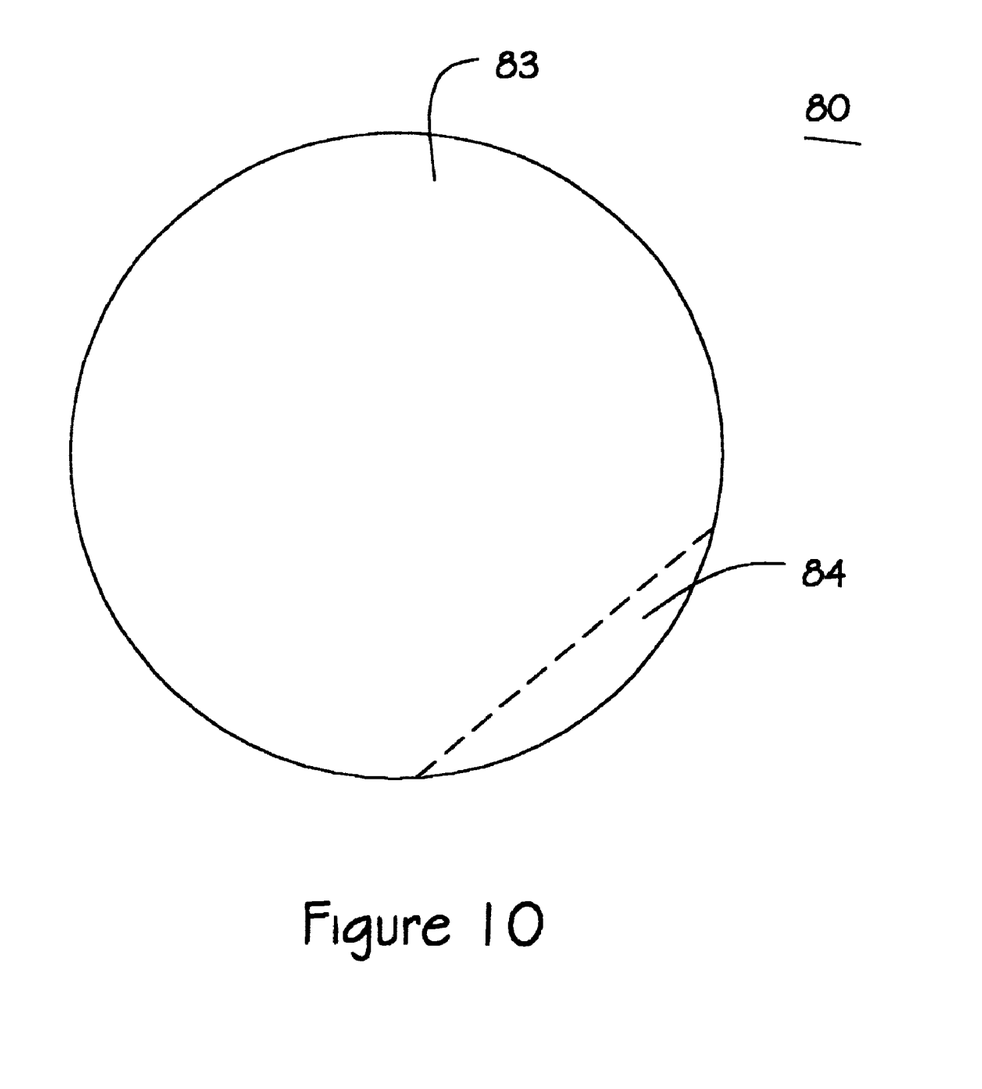
FIG. 10 is a plan view of a spacer substrate and the chord taken therefrom.

Referring to FIGS. 6 and 10, in Step 630, a small section 84 is then sliced from the spacer S substrate 80 along a chord as shown in FIG. 10. From this small section 84 is cut a "sample" spacer S measuring, for example, 3.0×3.0 mm Then in Step 640 the cut edges of the "sample" spacer are optically worked as described above to remove stress.

Figure 11:
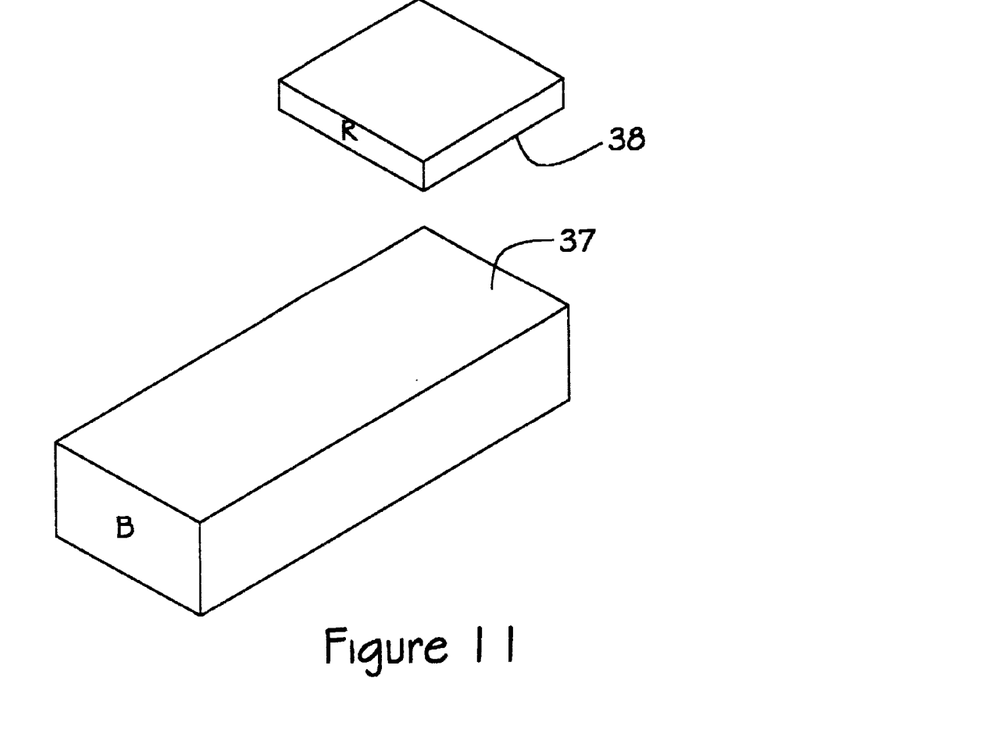
FIGS. 11 and 12 are perspective views showing the assembly of a riser with an etalon plate.
Figure 12:
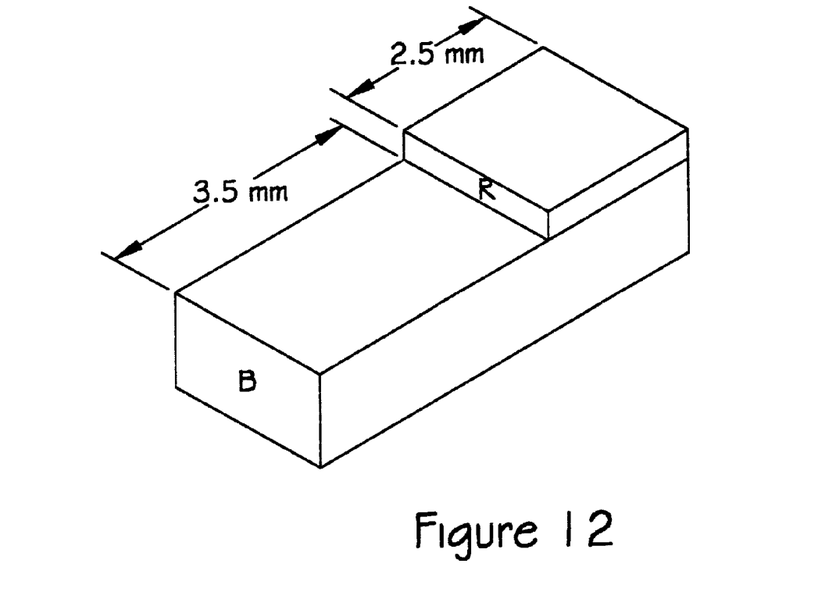

In Step 650, a "test etalon" is assembled. Referring to FIGS. 6 and 11, the uncoated side 37 of element B is optically contacted to the uncoated side 38 of the riser R. This results in the subassembly shown in FIG. 12. The riser R (having dimensions of 2.5×2.5 mm) covers a 2.5×2.5 mm area of element B at one end. Since plate B is 6.0×2.5 mm, the area not covered by the riser R is 3.5×2.5 mm. By optically contacting the sample spacer S between elements A and B a test etalon is completed.

In Step 660, optical performance information is obtained. For example, a channel spectrum indicating optical performance of the assembled etalon around the chosen wavelength (e.g. 1550 n) is measured using, for example, a tunable laser source. A satisfactory device is a Hewlett Packard model HP 8164 Lightwave Measurement System including a tunable laser module and a power measurement module. A high resolution monochromator and a chart recorder may also be used, as well as other measurement devices known to those having ordinary skill in the art. The spectral position of adjacent peaks 20 are accurately measured.

In Step 670, the performance information is analyzed. Determinations concerning the desired final spacer thickness are made. For example, using this information and the standard Fabry-Perot equation, the FSR 22 can be determined for consecutive transmission peaks 20. Using this information, the etalon gap thickness G needed to achieve the required FSR can be calculated. Also, this information may be used to calculate the gap thickness G needed to achieve the precise bandpass wavelengths of the transmission peaks. This information can be used to optimize other etalon parameters as discussed below.

In Step 680, based on the information gained in Steps 660 and 670 and remembering that the thickness of the spacer substrate 80 was deliberately made too thin, additional material may be coated onto the remaining large piece of the spacer substrate 83 bringing it to a desired final spacer thickness. Typically, the remaining large piece of the spacer substrate 83 is coated on one side with $SiO_2$ to a thickness which will bring the etalon gap width G to the precise width for the required FSR 22. Typically, using the RIRFMS techniques discussed earlier. Additionally, other low expansion coating materials may be used. Preferred coating surfaces may be optically contacted to and are temporally and environmentally stable. Typical coating materials include, but are not limited to, $AlO_2$, $Al_2O_3$, $ZiO_2$, $TiO_2$, $Ti_2O_3$, $HfO_2$, $ThFl_2$, as well as many rare earth oxides. Typically, these coatings are formed using RIRFMS techniques discussed previously. Although other coating techniques may be used, such techniques are preferred because they provide surfaces which can be easily optically contacted to. In one embodiment, the coatings result in an etalon having an FSR 22 of 100 GHz.

The coatings described above may be achieved using conventional optical coating processes known to those of ordinary skill in the art. However, with continued reference to FIG. 5, the optical coatings 31, 32, 34, 35 can be formed using certain types of coatings and techniques which provide certain specific advantages which are of particular usefulness when used in the mass production of etalons. For example, by depositing a coating from elemental material using RIRFMS, superior coatings may be formed. These exhibit very high temporal stability, low loss, very low stress, and provide excellent surfaces for optical contacting. If such coatings are applied using RIRFMS, the coatings are such that they facilitate excellent optical contact with other optical components. For example, even if all of side 34 is coated, the coating will still allow excellent bonding with the spacer S. Hence this coating process allows the entire substrate 70 to be coated on side 34 prior to cutting the substrate 70 into pieces 71. For purposes of high volume manufacturing, this is an extremely advantageous feature because it avoid the need to use substrate masking to protect the areas of the substrate which will later be optically contacted to. However, other coating materials and techniques as known in the art may also be used.

In Steps 690 and 692, the spacer substrate 83 is then cut into pieces S, preferably having dimensions of about 3.0×3.0 mm, and optically worked as described above. In Step 696, a completed batch of etalons 30 may be constructed from said plurality of first and second etalon plates, risers R, and spacers S. Once assembled, all interfaces are sealed with silica ceramic cement.

The above-described process of etalon construction is especially advantageous for commercial etalon production, since a large number of etalons 30 can be fabricated from a small number of substrates. For example, using substrate plates of 150 mm in diameter, a manufacturing batch of two plate A substrates 70; two plate B substrates 70; one riser R substrate; and one plate S substrate 80, a batch of approximately 2,000 complete air-spaced etalons may be constructed. This is a very different process from known methods of constructing etalons where batch sizes range from between 20–50 etalons per batch. Thus, for the first time, the present invention makes the fabrication of large numbers of precision etalons at low cost enabling high volume etalon applications, such as telecommunications.

Additionally, the principles of the present invention as disclosed herein may also be used to mass produce etalon filters having a plurality of spacers. Such filters find numerous uses including use as telescopic filters for solar observation. Such etalon filters and methods of fabrication are discussed in patent application P974, entitled "High Performance Telescopic Etalon Filters", filed on May 27, 1999 and hereby incorporated by reference.

Figure 13:
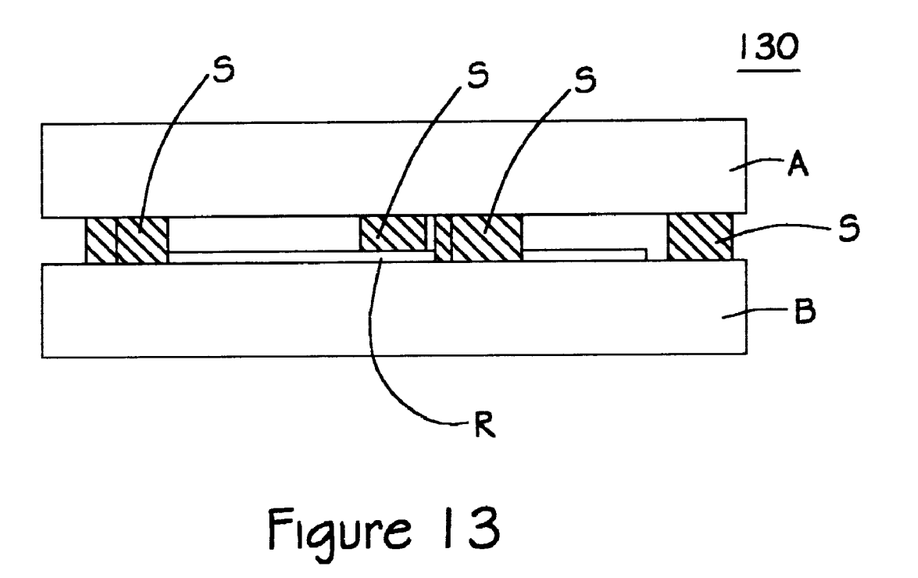
FIG. 13 is a plan view of an etalon depicting the locations of test regions.

The plates used in telescope applications may be quite large, as needed to cover the objective lens of a telescope. In order to attain the necessary degree of parallelism in such large etalon plates more than one spacer may be required to separate the plates. One of the difficulties of such multi-spacer arrangements is that variation in spacer thickness reduces the optical fidelity of the final etalon. An example of such a multi-spacer etalon is shown in FIG. 13. The construction of such etalons is fully described in patent application P974, entitled "High Performance Telescopic Etalon Filters". The principles of the present invention serve to reduce the variation in spacer thickness.

The principles of the present invention may be used to adjust the optical characteristics of etalons after initial construction. This advantageous feature is not known in the prior art. Etalons may be adjusted to one or more of the following parameters:
1. The finesse (F) may be adjusted by increasing the parallelism between the plates A, B.
2. The FSR of the etalon may be adjusted to a higher degree of precision by controlling the width of the etalon gap to a very high degree of precision.
3. The etalon transmission peaks may be adjusted and tuned to specific wavelengths (X) with a very high degree of accuracy by adjusting gap width.

In accordance with the principles of the present invention and with reference to FIG. 13, the above-referenced parameters can be adjusted by changing the thickness of spacers S. This is typically, accomplished by depositing on the spacers S a suitable coating material, for example, $SiO_2$. The thickness of these coatings can be controlled within very narrow tolerances, on the order of about 1% of the coating thickness.

This process begins by providing suitable plates. Subsequently, spacers are provided. The thickness of the spacers is slightly less than their intended final thickness. The etalon 130 is assembled and performance characteristics are measured generating a channel spectrum. As explained previously, a tunable laser source may be used to generate channel spectra. The channel spectra are measured at different locations on the etalons, for example, in the regions shown by X, Y, and Z. A channel spectrum may be measured at each location X, Y, and Z. This information may be used to optimize the parameters mentioned above.

Figure 4:
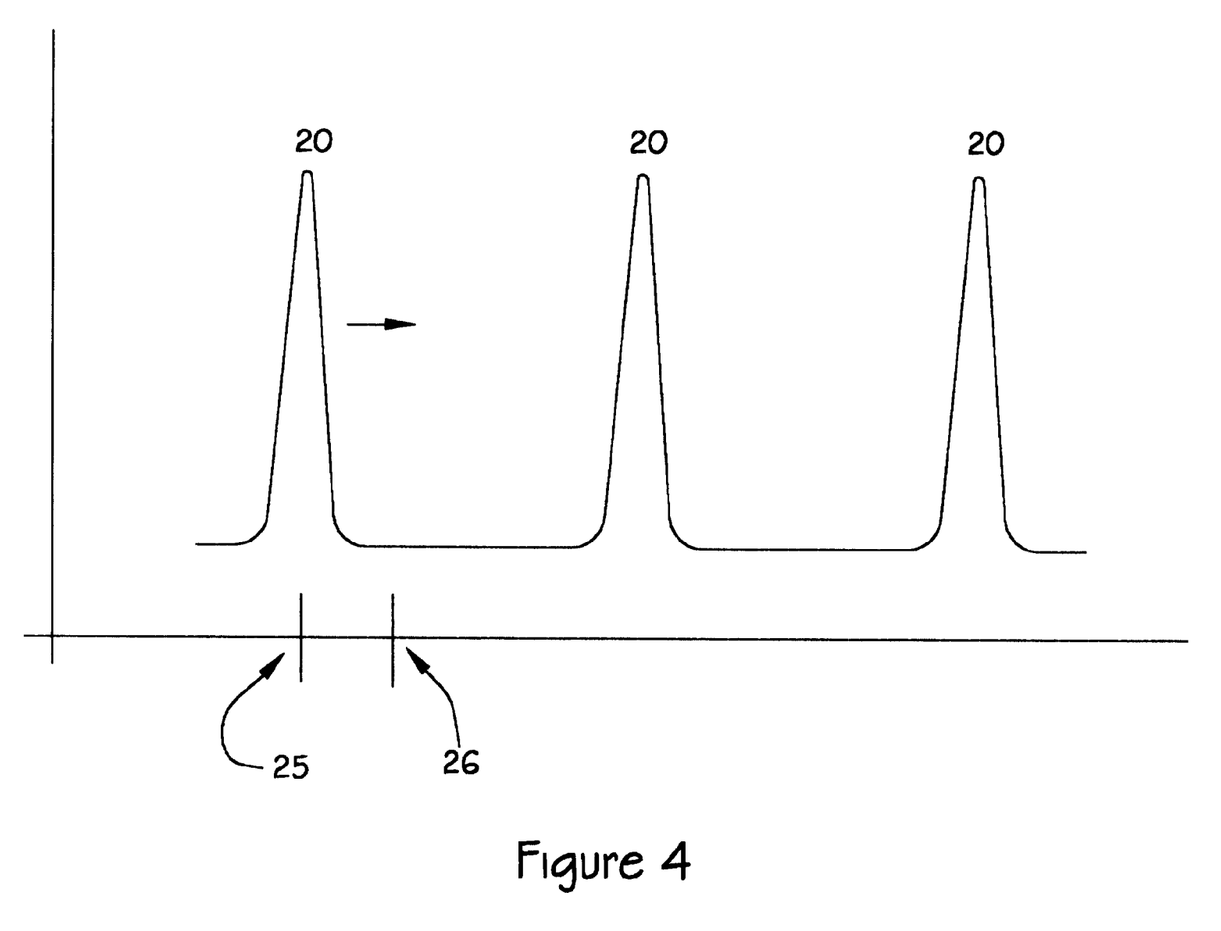
FIG. 4 is a graphical representation of a channel spectrum which may be used to adjust an etalon filter.

Referring to the example channel spectrum shown in FIG. 4, the transmission peaks 20 may be adjusted using the principles of the present invention. For example, if a transmission peak 25 has a wavelength just slightly shorter than the desired tuned wavelength 26, the spacers may be coated to widen the gap sufficiently to move the transmission peak 25 to the desired tuned wavelength 26.

Parallelism between etalon plates may also be improved. After analysis, at locations X, Y, and Z, a gap width is determined near each spacer S. One spacer will be thicker than the other two. Material is then coated onto the two thinner spacers bringing them into uniformity with the third spacer. This allows increased gap width uniformity and increased parallelism between the plates.

Also for example, the spectral distance between adjacent transmission peaks can be measured and the FSR of the etalon 130 can be calculated using the standard Fabry-Perot equation. This corresponds to the gap width of the etalon 130. Remembering that the thickness of the spacers was deliberately thinner than the final desired thickness, by coating a suitable material over each of the spacers, the gap width can be increased to a thickness that produces an etalon with the desired FSR. Typically, the spacers are coated on one side with $SiO_2$ material to a thickness which will bring the etalon gap to the precise thickness for the required FSR. The measurements can be repeated to confirm that etalon performance meets the required specifications.

The coatings described above may be achieved using conventional optical coating processes known to those of ordinary skill in the art. However, certain types of coatings and techniques provide certain advantages which are of particular usefulness when used in the mass production of etalons. For example, by depositing a coating using RIRFMS, coatings exhibiting very high temporal stability, low loss, and very low stress. Coatings formed in this manner have the further advantage of forming surfaces which allow optical contacting to other already coated surfaces. Once suitable etalon performance is achieved the etalon is completed.

The present invention has been particularly shown and described with respect to certain preferred embodiments and features thereof. It is to be understood that the shown embodiments are the presently preferred embodiments of the present invention and as such are representative of the subject matter broadly contemplated by the present invention. The scope of the invention fully encompasses other embodiments which may become obvious to those skilled in the art, and are accordingly to be limited by nothing other than the appended claims, in which reference to an element in the singular is not intended to mean "one and only one" unless explicitly stated, but rather "one or more". All structural and functional equivalents of the elements of the above-described preferred embodiment that are known or later come to be known to those of ordinary skill in the art are expressly incorporated herein by reference and are intended to be encompassed by the present claims. Moreover, it is not necessary for a device or method to address each and every problem solved by the present invention, for it to be encompassed by the present claims. Furthermore, no element, component, or method step in the present disclosure is intended to be depicted to the public regardless of whether the element, component, or method step is explicitly recited in the claims. No claim element herein is to be construed under the provisions of 35 U.S.C. § 112, paragraph 6, unless the element is expressly recited using the phrase "means for".

What is claimed is:

1. A thermally stable re-entrant air-spaced etalon wherein thermal expansion of a riser element is counterbalanced by thermal expansion of a spacer element such that a thermally stable gap is created between said riser element and said spacer element.

2. The thermally stable etalon of claim 1, wherein said thermally stable gap has a coefficient of thermal expansion of less than about $5 \times 10^{-8}$ per Kelvin.

3. The thermally stable etalon of claim 1, wherein said thermally stable gap has a coefficient of thermal expansion of less than about $1 \times 10^{-8}$ per Kelvin.

4. The thermally stable etalon of claim 1, wherein said thermally stable gap has a coefficient of thermal expansion of less than about $1 \times 10^{-9}$ per Kelvin.

5. The thermally stable etalon of claim 1, said etalon having a free spectral range of less than about 100 GHz.

6. A thermally stable etalon filter as in claim 1 wherein said filter has a free spectral range of about 100 GHz.

7. A thermally stable etalon filter as in claim 1 wherein said filter has a free spectral range of about 50 GHz.

8. A thermally stable etalon as in claim 1 wherein said etalon selects transmission peaks spaced at about 100 GHz and having temperature stability of transmission peaks of about one picometer per Kelvin and said transmission peaks corresponding to an ITU accepted standard grid.

9. A dense wavelength division-multiplexing etalon comprising:

a first optical plate having a first optical surface, said first optical surface being sufficiently flat to maintain a required finesse;

a second optical plate having a second optical surface;

a third optical plate having a third optical surface, said third plate being in contact with said second optical surface and having a thickness in a direction perpendicular to said third optical surface, said third optical surface parallel to and of like flatness with said first optical surface;

said first optical surface and said third optical surface being held in a spaced apart relationship defining a gap width between said first and third surfaces; and said gap width having a coefficient of thermal expansion of less than $5 \times 10^{-8}$ per Kelvin.

10. An etalon as in claim 9, wherein said thickness of said third optical plate is less than ten times the width of said gap.

11. An etalon as in claim 9, wherein said thickness of said third optical plate is less than one time the width of said gap.

12. An etalon as in claim 9, wherein said thickness of said third optical plate is less than half the width of said gap.

13. An etalon as in claim 9, wherein said thickness of said third optical plate is less than one fifth the width of said gap.

14. A thermally stable etalon having transmission peaks at selected wavelengths conforming to an International Telecommunications Union standard grid, said etalon comprising:

a first optical element;

a second optical element;

a third optical element being optically contacted to said second optical element;

a spacer element;

said first optical and second optical elements being held in a spaced apart relationship by said spacer element such that said first and third optical elements define a gap having a width allowing said etalon to pass said selected wavelengths of light; and said spacer element and said third optical element each having a different coefficient of thermal expansion, the thickness and coefficient of thermal expansion of said third optical element and the thickness and coefficient of thermal expansion of said spacer element each being such that the thermal expansion of the third optical element is substantially the same as the thermal expansion of the spacer element, thereby thermally stabilizing said gap width.

15. A thermally stable etalon as in claim 14 wherein said etalon further comprises having said transmission peaks at discrete wavelengths spaced at intervals of about 100 gigahertz, said etalon having temperature stability of the transmission peaks in the range of ±1 picometer per Kelvin.

16. The thermally stable etalon of claim 14, wherein said gap has a coefficient of thermal expansion of less than about $5 \times 10^{-8}$ per Kelvin.

17. A thermally stable etalon as in claim 14, wherein said third optical element has a thickness of about 0.274 millimeters and wherein said spacer element has a thickness of about 1.776 millimeters.

18. A thermally stable etalon as in claim 17 wherein said spacer element is formed of CLEARCERAM Z and said third optical element is formed of fused silica.

19. A thermally stable etalon as in claim 14 wherein said spacer element further includes at least one layer of a coating material.

20. A thermally stable etalon as in claim 14 wherein said gap width is adjusted by the application of coating material onto said spacer element.

21. A thermally stable etalon as in claim 20 wherein said coating material is applied using reactive ion radio frequency magnetron sputtering.

22. A thermally stable etalon as in claim 21 wherein said coating material is silicon dioxide.

23. A thermally stable etalon as in claim 20 wherein said coating material is applied as alternating layers of amorphous hydrogenated silicon and silicon dioxide.

24. A thermally stable etalon as in claim 14, wherein the coefficient of thermal expansion of said third optical element is greater than that the coefficient of thermal expansion of the spacer element and said third optical element being of such thickness as to compensate for a thermal expansion of said spacer, thereby providing temperature stability of said gap width.

25. The thermally stable etalon of claim 24, wherein the thickness of said third optical element is less than 10 times the width of the gap.

26. A thermally stable etalon as in claim 24, wherein the thickness of said third optical element is less than about one time the width of the gap.

27. A thermally stable etalon as in claim 24, wherein the thickness of said third optical element is less than about 0.2 times the width of the gap.

28. A method of mass producing etalons having high optical fidelity, said method comprising the steps of:

A. providing a first substrate;

B. providing a second substrate;

C. providing a third substrate;

D. providing a spacer substrate having a thickness less than a desired final spacer thickness;

E. separating said first, second, and third substrates in to a plurality of appropriately sized first etalon plates, second etalon plates, and risers, respectively;

F. removing mechanical stress from each of said plurality of first etalon plates, second etalon plates, and risers;

G. removing a single sample spacer from said spacer substrate;

H. removing mechanical stress from said sample spacer;

I. assembling a test etalon from one each of said first etalon plates, second etalon plates, risers, and the sample spacer, said test etalon defining a gap;

J. performance testing said test etalon to obtain performance information;

K. calculating said desired final spacer thickness from said performance information;

L. adjusting the thickness of said spacer substrate such that spacers made from said spacer substrate have the desired final spacer thickness;

M. separating said spacer substrate into a plurality of appropriately sized spacers;

N. removing mechanical stress from each of said spacers; and

O. assembling etalons from one each of said first etalon plates, second etalon plates, risers, and spacers.

29. A method as in claim 28, wherein said steps of providing a first substrate, a second substrate, and a spacer substrate further includes providing a fused silica first substrate, a fused silica second substrate, and a fused silica spacer substrate and said step of providing said third substrate includes providing said third substrate comprised of CLEARCERAM Z.

30. A method as in claim 29, wherein said step of providing third substrate further includes providing a third substrate of about 0.274 millimeters thick and wherein said step of providing spacer substrate further includes providing a spacer substrate of about 1.776 millimeters thick.

31. A method as in claim 28, wherein said assembled etalons have a gap, said gap having a coefficient of thermal expansion of less than about $5 \times 10^{-8}$ per Kelvin.

32. A method as in claim 28, wherein said assembled etalons have a free spectral range of 100 GHz.

33. A method as in claim 28, wherein said assembled etalons have bandpass wavelengths corresponding to an ITU standard grid.

34. A method as in claim 28, wherein said step of providing said third substrate further includes providing a third substrate having a thickness less than 10 times a width of the gap.

35. A method as in claim 28, wherein said step of providing said third substrate further includes providing a third substrate having a thickness less than a width of the gap.

36. A method as in claim 28, wherein said step of providing said third substrate further includes providing a third substrate having a thickness less than 0.2 times a width of the gap.

37. A method as in claim 28, wherein said step of testing the performance of said test etalon comprises testing with a tunable laser.

38. A method as in claim 28, wherein said step of testing the performance of said test etalon comprises testing with a monochromator.

39. A method as in claim 28, wherein said step of adjusting the thickness of said spacer substrate adjusts etalon performance parameters.

40. A method as in claim 39, wherein said adjusting step adjusts etalon performance parameters selected from the group consisting of free spectral range, transmission peak bandpass wavelength, and finesse.

41. A method as in claim 39, wherein said step of adjusting the thickness of said spacer substrate is accomplished by coating said spacer substrate with a suitable material.

42. A method as in claim 41, wherein said step of adjusting the thickness of said spacer substrate is accomplished by coating said substrate with a coating that may be optically contacted to the first and second etalon plates.

43. The method of claim 41 wherein said suitable material is temporally and environmentally stable.

44. The method of claim 41 wherein said suitable material is coated onto said substrate in a manner which allows optically contacting to said suitable material.

45. A method as in claim 41, wherein said step of coating said spacer substrate with a suitable material includes coating said spacer with silicon dioxide.

46. A method as in claim 41, wherein said step of coating said spacer substrate with a suitable material includes coating said spacer substrate by reactive ion radio frequency magnetron sputtering.

47. A method of mass producing and tuning large etalon filters, said method comprising the steps of:

A. providing an assembled etalon having a first and a second etalon plate separated by a set of spacers each having a thickness less than a desired final spacer thickness;

B. measuring the performance characteristics of said assembled etalon to obtain performance information;

C. adjusting said performance characteristics by applying a coating material onto selected spacers using said performance information to determine the necessary thickness to achieve the desired final spacer thickness in said set of spacers; and D. final assembly of said etalon.

48. The method of claim 47 wherein said step of adjusting said performance characteristics, C), adjusts the free spectral range of said etalon.

49. The method of claim 47 wherein said step of adjusting said performance characteristics, C), adjusts the bandpass wavelengths of the etalon transmission peaks.

50. The method of claim 47 wherein said step of adjusting said performance characteristics, C), adjusts the parallelism of said first and said second etalon plates.

51. A method of mass producing and tuning large etalon filters as in claim 47 wherein said method includes the further step of providing a riser plate which is optically contacted to said second etalon plate.

52. The method of claim 51 wherein said step of adjusting said performance characteristics, C), adjusts the free spectral range of said etalon.

53. The method of claim 51 wherein said step of adjusting said performance characteristics, C), adjusts the bandpass wavelengths of the etalon transmission peaks.

54. The method of claim 51 wherein said step of adjusting said performance characteristics, C), adjusts the parallelism of said first etalon plate and said riser plate.

* * * * *